(No Model.)
J. C. MacSPADDEN.
INFLATION TUBE.
No. 603,510.  Patented May 3, 1898.
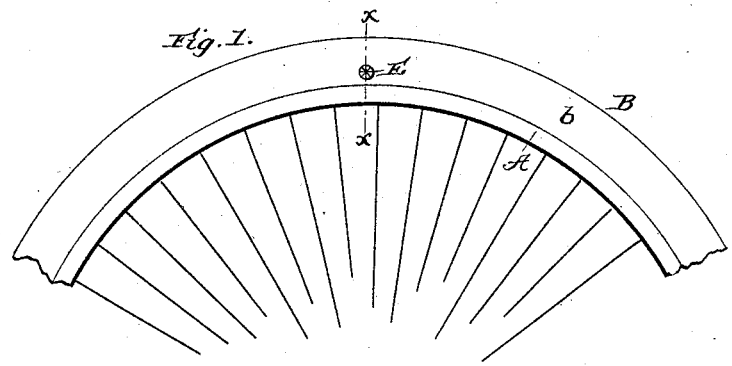
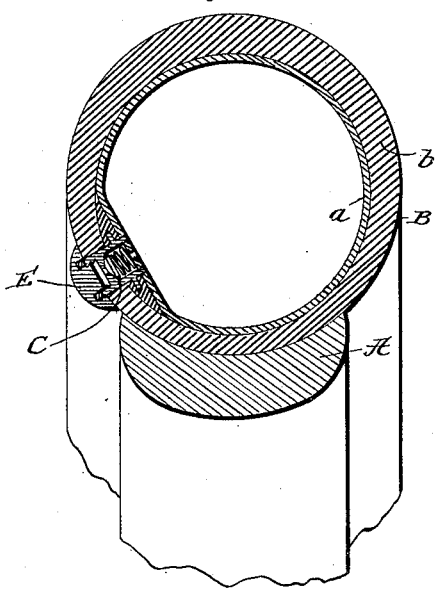
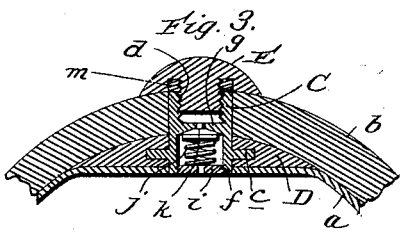
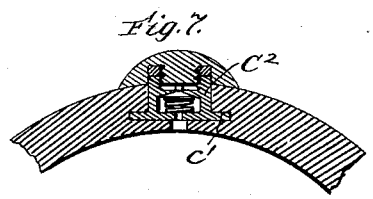
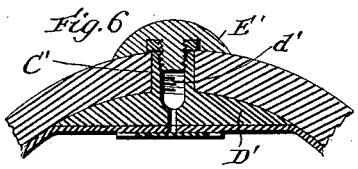
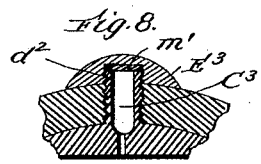
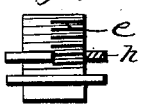
Witnesses:
Inventor
J. C. MacSpadden
By James Sheehy
Attorney
THE NORRIS PETERS CO., PHOTO-LITHO., WASHINGTON, D. C.

UNITED STATES PATENT OFFICE.

JOHN C. MacSPADDEN, OF ST. JOSEPH, MISSOURI.

INFLATION-TUBE.

SPECIFICATION forming part of Letters Patent No. 603,510, dated May 3, 1898.

Application filed June 30, 1897. Serial No. 642,989. (No model.)

*To all whom it may concern:*

Be it known that I, JOHN C. MACSPADDEN, a citizen of the United States, residing at St. Joseph, in the county of Buchanan and State of Missouri, have invented certain new and useful Improvements in Inflation-Tubes; and I do declare the following to be a full, clear, and exact description of the invention, such as will enable others skilled in the art to which it appertains to make and use the same.

My invention relates to improvements in inflation-tubes for pneumatic tires, and will be fully understood from the following description and claims when taken in conjunction with the accompanying drawings, in which—

Figure 1 is a detail side elevation of a portion of a bicycle-wheel equipped with a tire embodying my improvements. Fig. 2 is an enlarged transverse section taken in the plane indicated by the line $x\ x$ of Fig. 1. Fig. 3 is an enlarged section illustrating the details of one embodiment of my invention. Fig. 4 is an enlarged elevation of the inflation-tube proper. Fig. 5 is a similar view of the dust-excluding cap, and Figs. 6, 7, 8, and 9 are detail sectional views of modifications.

Referring by letter to the said drawings and more particularly to Figs. 1 to 5 thereof, A indicates the rim of a bicycle-wheel, which may be of the ordinary form and construction, except that it need not be provided with the usual aperture for the passage of the inflation-tube.

B indicates a pneumatic tire which comprises an inner tube $a$ and an outer covering $b$, and C indicates my improved inflation-tube, which is connected with and extends through the inner and outer tubes $a\ b$ or the outer tube alone of the tire B and is arranged at the side of the tire or at any other suitable point where it will not contact with the rim A, for a purpose presently pointed out. This tube C has an integral flange $c$, which rests and is secured by vulcanization in an ordinary rubber valve-base D on the inner tube $a$, and it also has the interior threads $d$ at its outer end, the interior threads $f$ at its inner end, and the interior valve-seat $g$. The tube may also have exterior threads $e$, if desired, for the engagement of a threaded collar $h$, (see Fig. 9,) which clamps the base D against the flange $c$ and thereby strengthens the connection of the tube to said base D. The inner end of said tube is occupied by a threaded and apertured disk $i$, against which bears a coiled spring $j$, which has for its purpose to normally hold the check-valve $k$ against its seat $g$ in the ordinary manner.

The outer end of the tube C rests flush with the exterior surface of the outer tube or cover $b$ of the tire, as shown, and it is designed to be closed by the cap E. (Better illustrated in Figs. 3 and 5.) This cap E is of convex-plano shape in cross-section, and it has the threaded shank $l$ to take into the threaded end of the tube and the gasket or washer $m$ to bear against the end of the same, and also has its outer convex side roughened, so as to permit of it being readily turned with the fingers of one hand. The gasket or washer $m$ rests in an annular recess $m^2$ in the inner side of the cap, and this, as will be readily perceived, permits of the flat inner side of the cap being forced tightly against the exterior of the tire around the inflation-tube, so as to effectually prevent dust from working its way into said tube, and also by crowding the washer against the outer end of the inflation-tube to prevent air from working its way out. The cap of the form shown and described is preferable for the reason that when its shank is turned into the threaded end $d$ of the tube C its flat face will bear tightly against the rubber tire, and in consequence dust will be effectually prevented from working its way underneath the cap, and at the same time no projection will be afforded for the lodgment of dust or to contact with objects.

The arrangement of the inflation-tube at the side of the tire or at any other suitable point where it will not contact with the rim A is advantageous, first, because it will not in any way be effected in the event of the tire getting loose and working around on the rim; second, because it is in a very convenient position for the connection and operation of an inflating-pump, and, third, because there is no possible chance of the valve-stem or inflation-tube being cut off.

In Fig. 6 of the drawings I have illustrated a modification in which the inflation-tube C' is formed integral with the rubber base D', and a flap-valve is employed. This inflation-tube C' is provided with interior threads $d'$ and is made of rubber and fabric. Said tube is designed to be normally closed by a dust-cap E', of rubber, metal, or other suitable material, which has a threaded shank engaging the threads $d'$, and also has a washer, as shown.

In Fig. 7 I have shown my improvements as applied to a single-tube or "hose-pipe" tire. In this construction the inner flange $c'$ of the tube $C^2$ is embedded in the material of the tire, as shown, and the said tube is thus secured to the tire.

In Fig. 8 is shown an example in which the inflation-tube $C^3$ is exteriorly threaded, and the cap $E^3$ is provided with a threaded socket $d^2$ to receive said tube and a gasket $m'$ at the inner end of the socket to bear against the end of the tube. The valve is omitted in Fig. 8; but it is obvious that any suitable valve may be employed.

I have shown and described the preferred constructions of inflation-tubes, but I do not desire to be understood as confining myself to the same or to any specific construction of inflation-tube, as my invention resides, chiefly, in the arrangement of the inflation-tube with respect to the tire and the rim of a wheel, as before pointed out. I also do not desire to be understood as confining myself to the embodiment of my invention in a double-tube tire, as it may be employed with equal advantage on a single-tube or hose-pipe tire, as shown in Fig. 7.

Having thus described my invention, what I claim is—

1. The combination of a pneumatic or inflatable tire, a threaded inflation-tube secured in the tire and having its outer end arranged closely adjacent to the exterior of the tire, and the cap threaded to engage the inflation-tube and having the flat inner side with the recess therein and the packing arranged in said recess and bearing against the outer end of the inflation-tube, whereby the inner flat side of the cap is enabled to bear against the outside of the tire around the inflation-tube, substantially as specified.

2. The combination of a pneumatic or inflatable tire, a threaded inflation-tube secured in the tire with its outer end closely adjacent to the exterior of the tire and so arranged that, when the tire is placed on a wheel-rim, it will rest entirely outside said rim, and the cap of convex-plano form in cross-section threaded to engage the inflation-tube and having the recess in its inner side and the packing arranged in said recess and bearing against the outer end of the inflation-tube, whereby the inner flat side of said cap is enabled to bear against the outside of the tire around the inflation-tube, substantially as specified.

In testimony whereof I affix my signature in presence of two witnesses.

JOHN C. MacSPADDEN.

Witnesses:
ROBERT McCONN,
JNO. C. LANDIS.